US012284484B2

(12) United States Patent
Wang et al.

(10) Patent No.: US 12,284,484 B2
(45) Date of Patent: Apr. 22, 2025

(54) MICROPHONE CHIP AND MICROPHONE

(71) Applicant: AAC ACOUSTIC TECHNOLOGIES (SHENZHEN) CO., LTD., Shenzhen (CN)

(72) Inventors: Kaijie Wang, Shenzhen (CN); Zhuanzhuan Zhao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 302 days.

(21) Appl. No.: 18/072,669

(22) Filed: Nov. 30, 2022

(65) Prior Publication Data

US 2024/0073626 A1 Feb. 29, 2024

Related U.S. Application Data

(63) Continuation of application No. PCT/CN2022/119284, filed on Sep. 16, 2022.

(51) Int. Cl.
*H04R 19/04* (2006.01)
*H04R 1/08* (2006.01)
(Continued)

(52) U.S. Cl.
CPC ............. *H04R 19/04* (2013.01); *H04R 1/083* (2013.01); *H04R 7/18* (2013.01); *H04R 31/003* (2013.01)

(58) Field of Classification Search
CPC . H04R 19/04; H04R 7/04; H04R 7/18; H04R 2201/003; H04R 7/20; H04R 2207/021; H04R 19/005; H04R 1/04; H04R 1/2807; H04R 1/342; H04R 1/083; H04R 17/02; H04R 17/10; H04R 19/016; H04R 2201/02; H04R 2217/00; H04R 2201/029; H04R 1/222; H04R 7/16; H04R 1/28; H04R 2410/03; H04R 31/003; H04R 7/06; H04R 9/08; B81B 3/007; B81B 2201/0257; B81B 2203/0127; B81B 3/0072; B81B 7/0032;
(Continued)

(56) References Cited

U.S. PATENT DOCUMENTS 11,805,373 B2 * 10/2023 Zhao ........................ H04R 7/18
2010/0158279 A1 * 6/2010 Conti .................. H04R 19/005
381/174

(Continued)

*Primary Examiner* — Angelica M McKinney
(74) *Attorney, Agent, or Firm* — Wiersch Law Group

(57) ABSTRACT

A microphone chip and a microphone are provided. The microphone chip includes a substrate and a capacitive system disposed on the substrate. The capacitive system includes a diaphragm and a back plate spaced from the diaphragm, and there is an air spacing defined between the diaphragm and the back plate. The diaphragm includes an inner membrane portion, at least one outer membrane portion, and at least one supporting portion. The microphone chip further includes a supporting member. In an operating state, the inner membrane portion is adsorbed on the supporting member, and the supporting member is configured to divide the inner membrane portion into at least two regions. The diaphragm in the operating state is divided by the supporting member into a plurality of floating regions separated from each other, such that the rigidity of the diaphragm can be effectively adjusted and enhanced according to requirements.

12 Claims, 7 Drawing Sheets

(51) Int. Cl.
*H04R 7/18* (2006.01)
*H04R 31/00* (2006.01)

(58) Field of Classification Search
CPC ................ B81B 7/0058; B81B 7/0077; B81B 2201/0235; B81B 2203/0315; B81B 2207/012; B81B 2207/09; B81B 2207/092; B81B 2207/096; B81B 7/0064; B81B 3/001; B81B 3/0051; B81B 2203/019; B33Y 80/00; B33Y 10/00; B22F 10/28; B81C 1/00269; B81C 1/00888; B81C 2201/034; B81C 2203/0118; B81C 2203/032; B81C 2203/0792
See application file for complete search history.

(56) References Cited

U.S. PATENT DOCUMENTS

2015/0264464 A1* 9/2015 Okugawa ............. H04R 19/005
381/174
2018/0167740 A1* 6/2018 Uchida .................... H04R 9/08

* cited by examiner

MICROPHONE CHIP AND MICROPHONE

CROSS REFERENCE TO RELATED APPLICATIONS

The present application is a continuation of PCT Patent Application No. PCT/CN2022/119284, filed Sep. 16, 2022, which claims priority to Chinese patent application No. 202222259249.7, filed Aug. 25, 2022, each of which is incorporated by reference herein in its entirety.

TECHNICAL FIELD

The disclosure relates in general to the technical field of capacitive microphones, and more particularly to a microphone chip and a microphone.

BACKGROUND

With the development of wireless communication, mobile phone users are increasingly increased in the world. Users' requirements for mobile phones are not only satisfied with calls, but also able to provide high-quality call effects. Especially with the development of mobile multimedia technologies, the call quality of the mobile phone is more important. As a voice pickup device of the mobile phone, a design of a microphone of the mobile phone directly affects the call quality.

At present, microphones commonly used are capacitive microphones and micro-electro-mechanical system (MEMS) microphones, which are widely used in various terminal devices. The capacitive microphone includes a diaphragm and a back plate, which constitute a MEMS acoustic sensing capacitor, and the MEMS acoustic sensing capacitor is connected to a processing chip through a connecting disk to output an acoustic sensing signal to the processing chip for signal processing. In the related art, movement of the diaphragm is affected by its structure, resulting in poor performance of a chip of the MEMS microphone.

SUMMARY

Embodiments of the disclosure aim to provide a microphone chip and a microphone, which can effectively increase and adjust rigidity of the diaphragm as required.

Embodiments of the disclosure provide a microphone chip. The microphone chip includes a substrate having a front cavity, and a capacitance system disposed on the substrate. The capacitance system includes a diaphragm disposed on an upper surface of the substrate and a back plate spaced from the diaphragm, and there is an air spacing defined between the diaphragm and the back plate. The microphone chip further includes a fixing portion, and the diaphragm and the back plate are respectively connected with the substrate through the fixing portion. The diaphragm includes an inner membrane portion, at least one outer membrane portion, and at least one supporting portion, wherein the inner membrane portion and each outer membrane portion define a corresponding gap therebetween, and each of the at least one supporting portion is connected with the fixing portion and the inner membrane portion or is connected with the fixing portion and a corresponding one of the at least one outer membrane portion. The microphone chip further includes a supporting member, and the supporting member is connected with the back plate and is disposed between the back plate and the inner membrane portion; and in response to the microphone chip being in an operating state, the inner membrane portion is adsorbed on the supporting member, and the supporting member is configured to divide the inner membrane portion into at least two regions.

In some embodiments, the supporting member includes a closing portion and a partition portion. In a thickness direction of the microphone chip, the closing portion is disposed above the inner membrane portion and near an outer periphery of the inner membrane portion. The partition portion is connected to an inner circumference of the closing portion.

In some embodiments, each of the at least one supporting portion extends outward along a corresponding edge of the inner membrane portion and is connected to the fixing portion, and the at least one outer membrane portion is fixedly connected to the fixing portion.

In some embodiments, the at least one supporting portion is configured as one or more supporting portions.

In some embodiments, at least two outer film portions are provided. Each of the at least two outer film portions extends outward along a corresponding edge of the inner membrane portion and the at least two outer film portions are arranged around the inner membrane portion. In an extending direction of a respective outer film portion of the at least two outer film portions, one end of the respective outer membrane portion is connected to the inner membrane portion and an other end of the respective outer membrane portion is connected to a corresponding supporting portion.

In some embodiments, each of the at least one supporting portion extends outward along an edge portion of an end of a corresponding outer membrane portion away from the inner membrane portion and is connected to the fixing portion.

In some embodiments, there is a spacing between each of the two or more outer film portions and an inner circumference of the fixing portion.

In some embodiments, the microphone chip further includes an electrode sheet and an electrode guiding member. The electrode sheet is disposed on a side of the back plate close to the diaphragm, and the electrode sheet is divided into at least two pieces of electrode sheets by the supporting member. The electrode guiding member is configured to simultaneously lead out the at least two pieces of electrode sheets.

In some embodiments, the back plate defines at least two lead-out holes. The electrode guiding member is connected to a side of the back plate away from the diaphragm, and part of the electrode guiding member is connected to the at least two pieces of electrode sheets respectively through the at least two lead-out holes.

In some embodiments, the electrode guiding member is made from a metal material or another conductive material.

Embodiments of the disclosure provide a microphone. The microphone includes a microphone body and a microphone chip mounted on the microphone body. The microphone chip is the microphone chip described in any aspect of the disclosure.

The disclosure has following beneficial effects. The diaphragm in the operating state is divided by the supporting member into n floating regions separated from each other, thereby enhancing the rigidity of the diaphragm. Moreover, the required rigidity of the diaphragm can be adjusted by dividing the diaphragm in the operating state into two, three, four, . . . , or n floating regions. The more the floating regions of the diaphragm are divided, the stronger the rigidity is. In this way, it is possible to reduce a thickness of the diaphragm or increase an area of the diaphragm, thereby improving feasibility of the diaphragm.

Figure 1:
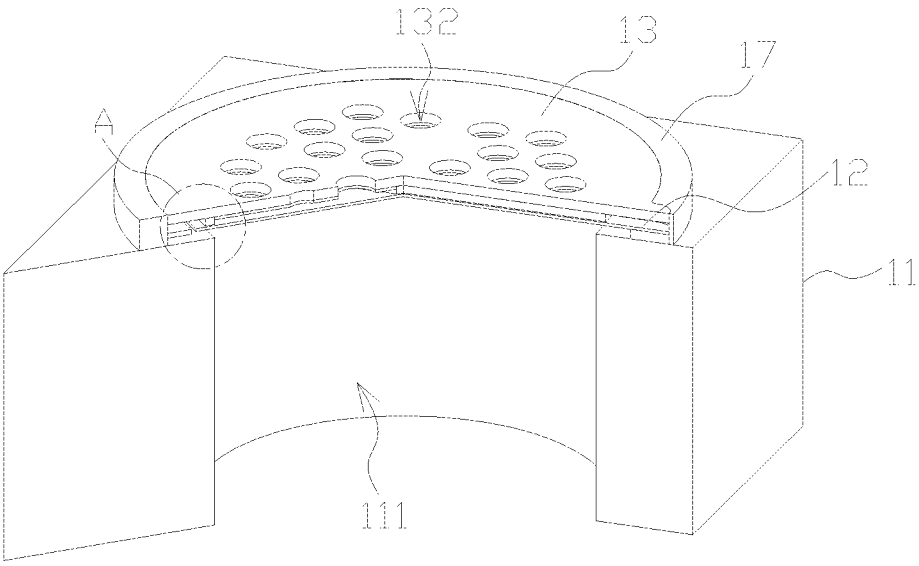
FIG. 1 is a cross-sectional view of a microphone chip according to embodiments of the disclosure.
Figure 2:
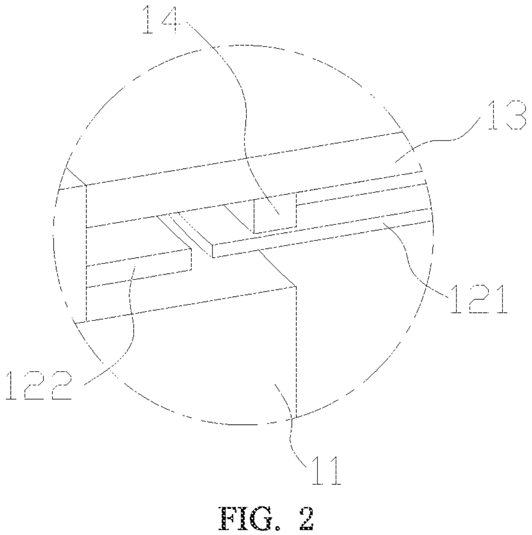
FIG. 2 is an enlarged schematic view of part A of FIG. 1.

The reference numerals are illustrated as follows: 1—microphone chip; 11—substrate; 111—front cavity; 12—diaphragm; 121—inner membrane portion; 122—outer membrane portion; 123—supporting portion; 13—back plate; 131—lead-out hole; 132—sound hole; 14—supporting member; 141—closing portion; 142—partition portion; 15—electrode sheet; 16—electrode guiding member; 161—collecting portion; 162—guiding portion; 17—fixing portion.

DETAILED DESCRIPTION OF THE EMBODIMENTS

The disclosure is further explained below with reference to the accompanying drawings and embodiments.

The embodiments provide a microphone. The microphone is capable of being used in an electronic device and used for receiving sound and converting the sound into an electrical signal. The microphone includes a microphone main body and a microphone chip 1, where the microphone chip 1 is mounted on the microphone main body.

Figure 7:
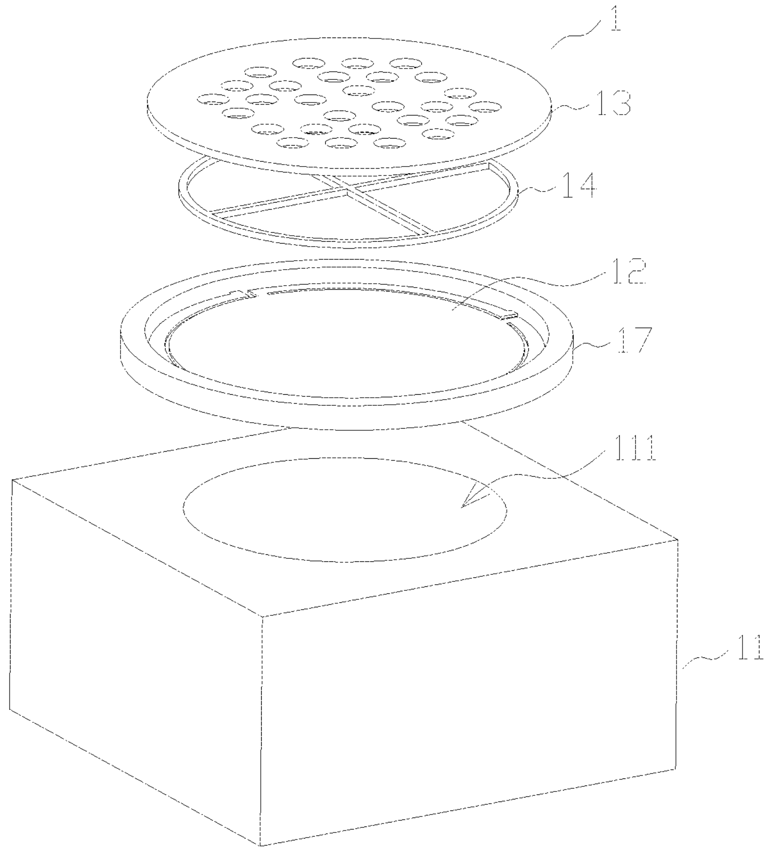
FIG. 7 is a schematic structural view of the microphone chip according to other embodiments of the disclosure.
Figure 11:
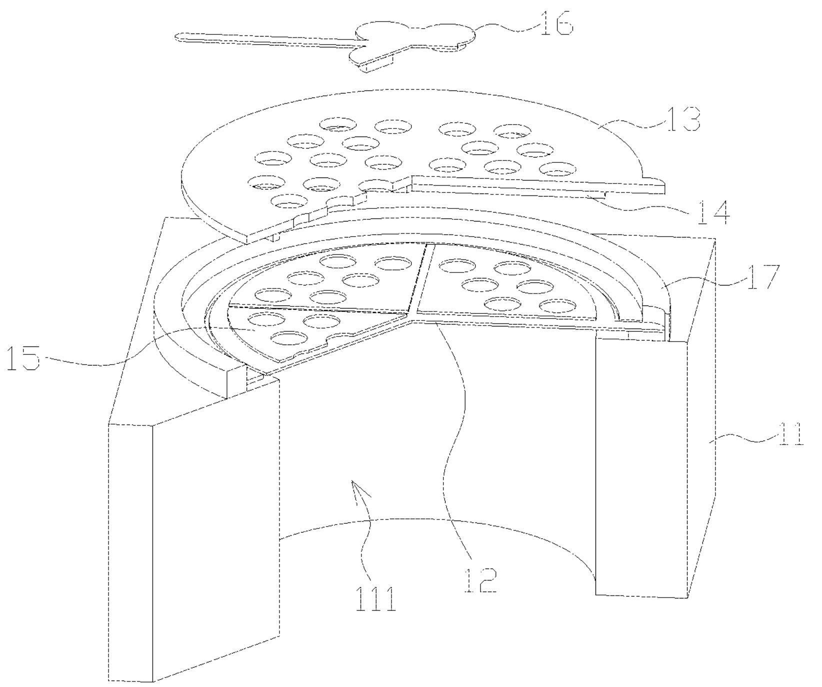
FIG. 11 is a schematic exploded view of FIG. 10.

Specifically, as illustrated in FIGS. 1, 7, and 11, the microphone chip 1 includes a substrate 11 having a front cavity 111, and a diaphragm 12 and a back plate 13 that are disposed on the substrate 11, where the back plate 13 is disposed spaced from the diaphragm 12. The diaphragm 12 is connected between the substrate 11 and the back plate 13 in a direction of vibration of the diaphragm 12, and there is an air spacing defined between the diaphragm 12 and the back plate 13. The diaphragm 12 and the back plate 13 form a capacitance system. When external sound is transmitted to the diaphragm 12 through the front cavity 111, the diaphragm 12 senses the external sound pressure and generates vibration, so that a distance between the diaphragm 12 and the back plate 13 changes and thus, a capacitance value of the capacitance system is changed, such that conversion from the sound signal to the electrical signal is realized.

As illustrated in FIGS. 1, 7, and 11, the microphone chip 1 includes a fixing portion 17. The diaphragm 12 and the back plate 13 are respectively connected to the substrate 11 through the fixing portion 17. The diaphragm 12 includes an inner membrane portion 121, at least one outer membrane portion 122, and at least one supporting portion 123. There is a gap between the inner membrane portion 121 and the outer membrane portion 122. The at least one supporting portion 123 connects the fixing portion 17 with the inner membrane portion 121 or connects the fixing portion 17 with the outer membrane portion 122. The microphone chip 1 further includes a supporting member 14 and the supporting member 14 is connected to the back plate 13 and disposed between the back plate 13 and the inner membrane portion 121. In an operating state, the inner membrane portion 121 can be adsorbed to the supporting member 14 and the supporting member 14 can divide the inner membrane portion 121 into at least two regions.

In embodiments of the disclosure, the supporting member 14 has a height. When the microphone is not operated, the inner membrane portion 121 is separated from the back plate 13 and the supporting member 14. When the microphone is in operation, the inner membrane portion 121 is attracted and adsorbed on the supporting member 14 by electrostatic force under bias voltage. In this case, the supporting member 14 divides the inner membrane portion 121 into at least two floating regions separated from each other. Since the supporting member 14 divides the inner membrane portion 121 in the operating state into n (e.g., n being a positive integer greater than or equal to 2) floating regions separated from each other, rigidity of the inner membrane portion 121 can be enhanced. For example, the required rigidity (stiffness) of the diaphragm 12 can be adjusted by dividing the diaphragm 12 in the operating state into two, three, four, . . . , or n floating regions. The more the floating regions of the diaphragm 12 are divided, the stronger the rigidity is. In this way, it is possible to reduce a thickness of the diaphragm 12 or increase an area of the diaphragm 12, thereby improving feasibility of the diaphragm 12.

Figure 3:
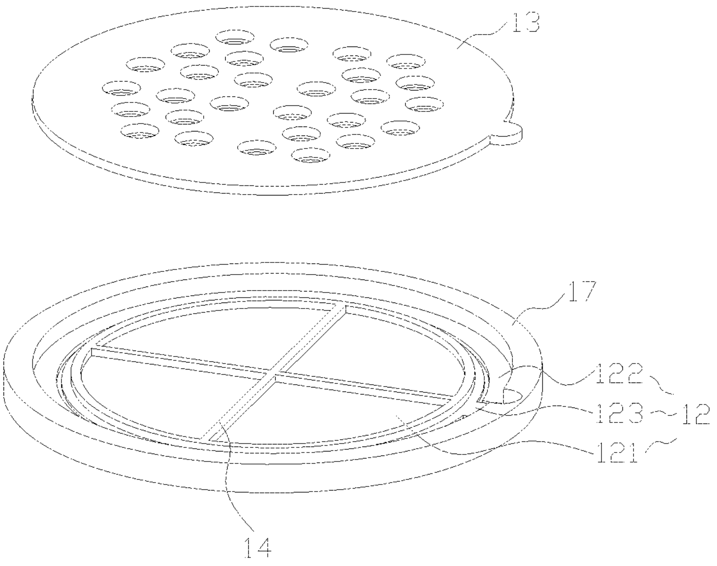
FIG. 3 is a schematic structural view of a back plate, a supporting member, and a diaphragm in FIG. 1.
Figure 4:
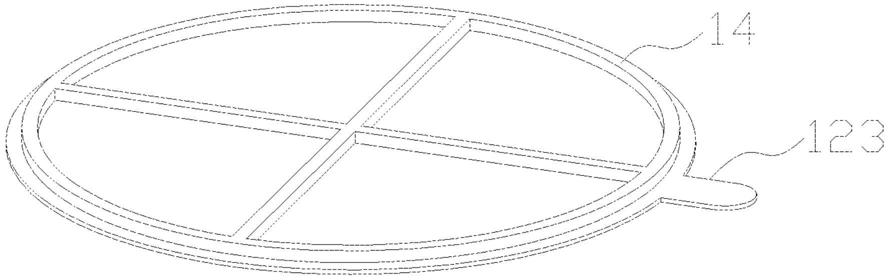
FIG. 4 is a schematic structural view of the supporting member and the diaphragm in FIG. 1.
Figure 5:
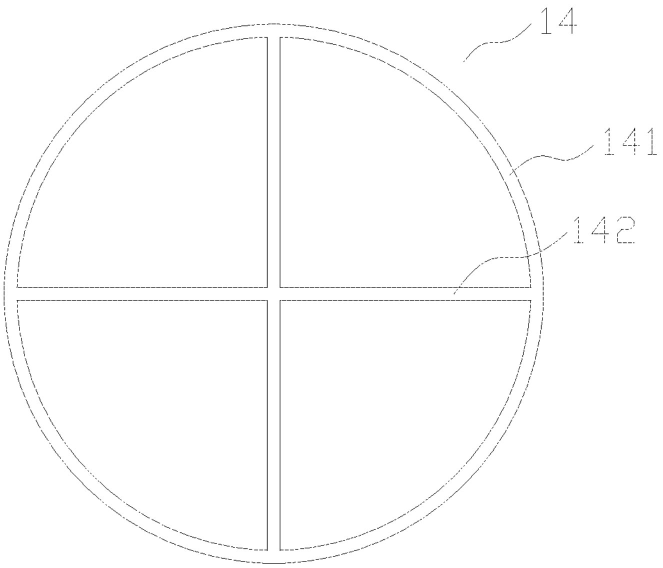
FIG. 5 is a schematic structural view of the supporting member in FIG. 1.

As shown in FIGS. 3 to 5, the supporting member 14 includes a closing portion 141 and a partition portion 142. In a thickness direction of the microphone chip 1, the closing portion 141 is arranged above the inner membrane portion 121 and near an outer periphery of the inner membrane portion 121. When the microphone is operated, the inner membrane portion 121 is attracted and adsorbed on the closing portion 141 by the electrostatic force, and the closing portion 141 supports the inner membrane portion 121 to reach the operating state, thereby avoiding low attenuation and improving the reliability of the microphone. The partition portion 142 is connected to an inner circumference of the closing portion 141. When the microphone is in the operating state, the microphone is partitioned by the partition portion 142. The partition portion 142 may be provided in a rod structure, both ends of the partition portion 142 are connected to the inner circumference of the closing portion 141, and the partition portion 142 divides the closing portion 141 into two parts, such that the inner membrane portion 121 are partitioned into two floating regions correspondingly. As shown in FIGS. 3 and 4, the partition portion 142 includes two connecting rods intersected, to partition the inner membrane portion 121 into four floating regions separated from one another during operation.

Figure 6:
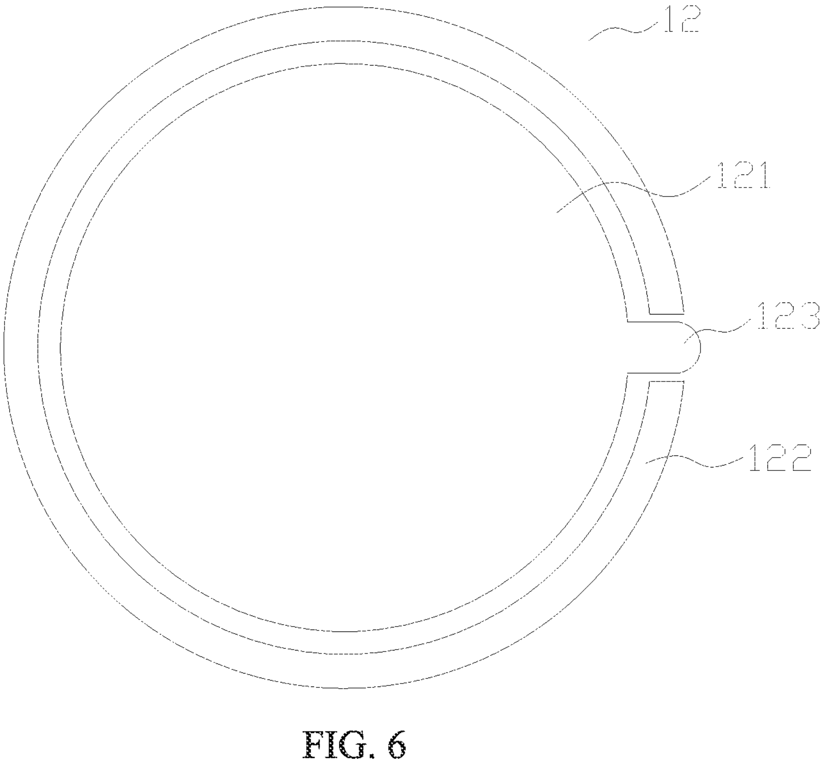
FIG. 6 is a schematic structural view of the diaphragm in FIG. 1.

As shown in FIGS. 4 and 6, in one embodiment, the supporting portion 123 extends outward along an edge of the inner membrane portion 121 and is connected to the fixing portion 17, and the outer membrane portion 122 is fixedly connected to the fixing portion 17.

In embodiments of the disclosure, the diaphragm 12 is processed so that the diaphragm 12 is formed with the inner diaphragm portion 121, the outer diaphragm portion 122, and the supporting portion 123 as illustrated in FIG. 6. There is the gap between the inner membrane portion 121 and the outer membrane portion 122, and the supporting portion 123 connects the inner membrane portion 121 and the fixing portion 17 to fix the inner membrane portion 121, thereby making the inner membrane portion 121 in a cantilever state, and ensuring sufficient stress release of the diaphragm material and increasing smooth movement of the diaphragm.

As shown in FIGS. 4 and 6, the at least one supporting portion 123 is configured as one supporting portion. That is, the diaphragm 12 can be connected and fixed to the fixing portion 17 by one arm, thereby further ensuring that the stress of the diaphragm 12 is released. Alternatively, the diaphragm 12 may be provided with a plurality of supporting portions 123, such as two or three supporting portions 123 or the like.

Figure 8:
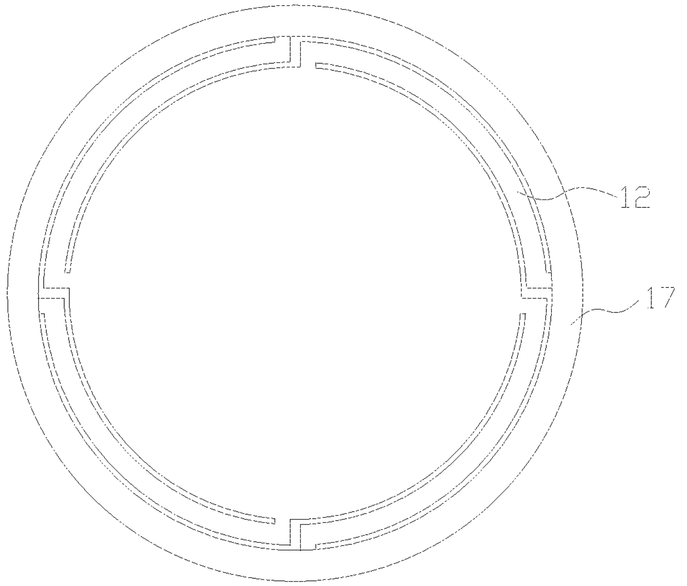
FIG. 8 is a schematic view illustrating fitting of the diaphragm and the fixing portion in FIG. 7.
Figure 9:
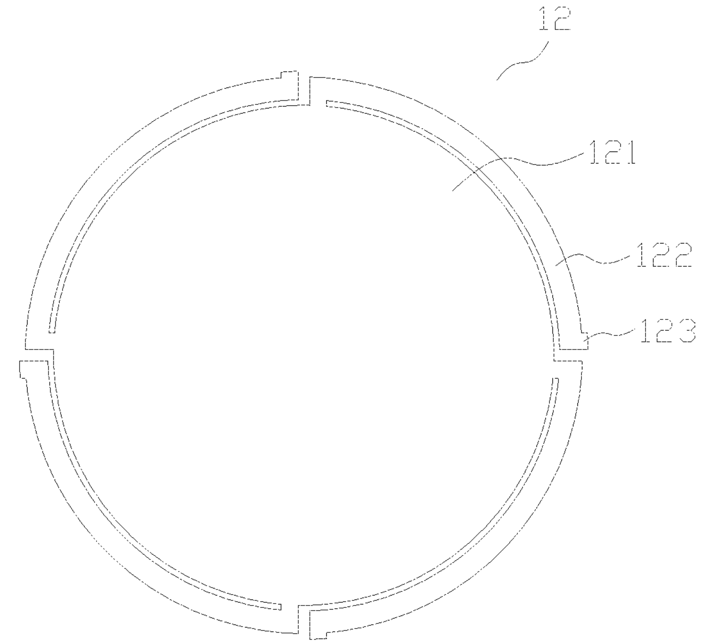
FIG. 9 is a schematic structural view of the diaphragm in FIG. 7.
Figure 10:
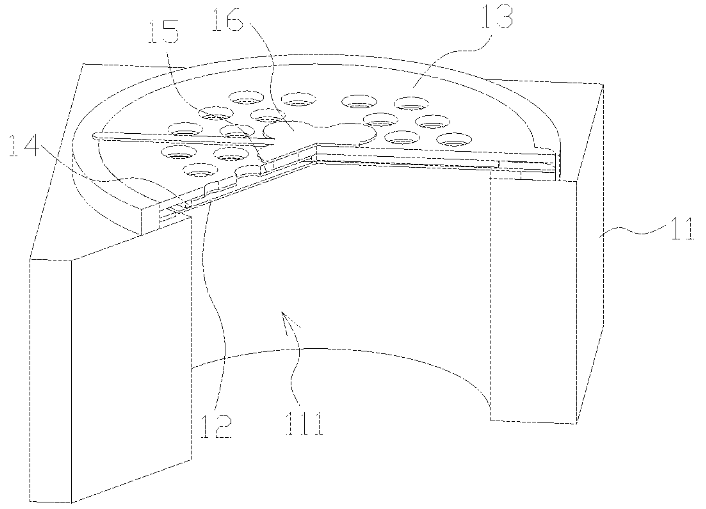
FIG. 10 is a cross-sectional view of the microphone chip according to embodiments of the disclosure.

In other embodiments, as shown in FIGS. 7 to 9, the at least one outer membrane portion 122 is arranged around the inner membrane portion 121. There is a gap between part of each outer membrane portion 122 and the inner membrane portion 121, and another part of the outer membrane portion 122 is connected with the inner membrane portion 121. Each supporting portion 123 is connected with a corresponding outer membrane portion 122 and the fixing portion 17, so as to reduce the constraint on the inner membrane portion 121 and effectively release the stress of the diaphragm 12. As shown in FIG. 8, there is a spacing between each outer membrane portion 122 and an inner circumference of the fixing portion 17 so that the sensitivity can be effectively improved, the binding force of the diaphragm can be reduced, and the stress can be effectively released.

Specifically, as shown in FIG. 8, at least two outer membrane portions 122 are provided. Each of the at least two outer membrane portions 122 extends outward along a corresponding edge of the inner membrane portion 121 and the at least two outer membrane portions 122 are disposed around the inner membrane portion 121. In an extending direction of each outer membrane portion 122, one end of the outer membrane portion 122 is connected to the inner membrane portion 121, and the other end of the outer membrane portion 122 is connected to a corresponding supporting portion 123, so that a gap is defined between a middle portion of the outer membrane portion 122 and the inner membrane portion 121, which is beneficial to releasing stress and prolonging service life of the diaphragm 12.

As shown in FIG. 9, four outer membrane portions 122 are provided and correspondingly four supporting portions 123 are also provided.

Furthermore, as shown in FIGS. 10 to 13, the microphone chip 1 further includes an electrode sheet 15. The electrode sheet 15 is provided on a side of the back plate 13 adjacent to the diaphragm 12. Since the supporting member 14 is provided on the back plate 13, it is necessary to perform division on the electrode sheet 15 to divide the electrode sheet 15 into at least two pieces of electrode sheets by the supporting member 14. Each piece of electrode sheet 15 is provided in a corresponding region separated by the partition portion 142. In order to lead out each piece of electrode sheet 15 at the same time, the microphone chip 1 further includes an electrode guiding member 16, and the electrode guiding member 16 can simultaneously lead out at least two pieces of electrode sheets 15, so as to solve the problem that each piece of electrode sheet 15 needs to be led out separately.

Figure 12:
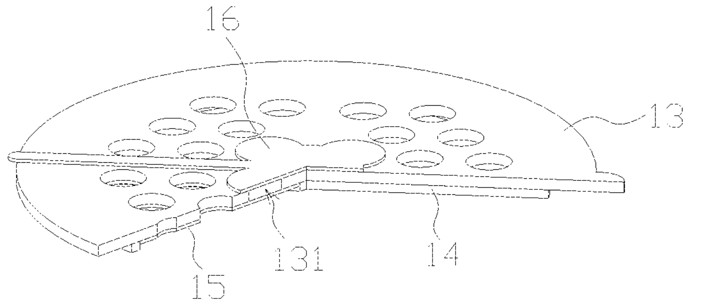
FIG. 12 is a cross-sectional view of an electrode guiding member, the back plate, an electrode sheet, and the supporting member in FIG. 10.

Specifically, as shown in FIGS. 11 and 12, the back plate 13 defines at least two lead-out holes 131, and the at least two lead-out holes 131 are defined in a middle region of the back plate 13. Each lead-out hole 131 is disposed corresponding to a corresponding piece of electrode sheet 15, and each piece of electrode sheet 15 corresponding to a respective lead-out hole 131 is not subjected to hole processing. The electrode guiding member 16 is connected to a side of the back plate 13 away from the diaphragm 12 and part of the electrode guiding member 16 can be connected to the at least two pieces of electrode sheets 15 respectively through the at least two lead-out holes 131.

Figure 13:
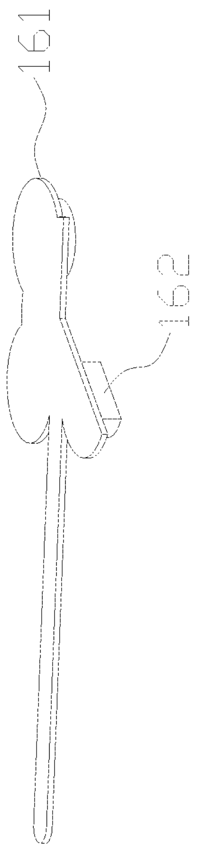
FIG. 13 is a cross-sectional view of the electrode guiding member in FIG. 10.

More specifically, as shown in FIGS. 12 and 13, the electrode guiding member 16 includes a collecting portion 161 and at least two guiding portions 162 that are connected to each other. The collecting portion 161 is disposed on the side of the back plate 13 away from the diaphragm 12, and each of the at least two guiding portions 162 is connected to a corresponding piece of electrode sheet 15 through a corresponding lead-out hole 131. The electrode sheet 15 does not define an opening at a position corresponding to the electrode guiding member 16. The back plate 13 further defines at least one sound hole 132 for conducting sound and balancing sound pressure, and the at least one sound hole 132 is defined on an outer periphery of the lead-out holes 131.

As shown in FIG. 13, the electrode sheet 15 is divided into four pieces of electrode sheets 15 by the supporting member 14. Correspondingly, the electrode guiding member 16 is provided with four guiding portions 162 and the back plate 13 defines four lead-out holes 131.

The electrode guiding member 16 may be made from a metal material or another conductive material.

The foregoing is merely some embodiments of the disclosure, and it is to be noted that improvements may be made to those of ordinary skill in the art without departing from the technical conception of the disclosure, but these are within the scope of protection of the disclosure.

What is claimed is:

1. A microphone chip, comprising:

a substrate having a front cavity; and a capacitance system disposed on the substrate, wherein the capacitance system comprises a diaphragm disposed on an upper surface of the substrate and a back plate spaced from the diaphragm, and there is an air spacing defined between the diaphragm and the back plate, wherein the microphone chip further comprises a fixing portion, and the diaphragm and the back plate are respectively connected with the substrate through the fixing portion;

the diaphragm comprises an inner membrane portion, at least one outer membrane portion, and at least one supporting portion, wherein the inner membrane portion and each outer membrane portion define a corresponding gap therebetween, and each of the at least one supporting portion is connected with the fixing portion and the inner membrane portion or is connected with the fixing portion and a corresponding one of the at least one outer membrane portion; and the microphone chip further comprises a supporting member, and the supporting member is connected with the back plate and is disposed between the back plate and the inner membrane portion; and in response to the microphone chip being in an operating state, the inner membrane portion is adsorbed on the supporting member, and the supporting member is configured to divide the inner membrane portion into at least two regions;

the supporting member comprises a closing portion and a partition portion; in a thickness direction of the microphone chip, the closing portion is disposed above the inner membrane portion and near an outer periphery of the inner membrane portion; the partition portion is connected to an inner circumference of the closing portion.

2. The microphone chip of claim 1, wherein each of the at least one supporting portion extends outward along a corresponding edge of the inner membrane portion and is connected to the fixing portion; and the at least one outer membrane portion is fixedly connected to the fixing portion.

3. The microphone chip of claim 2, wherein the at least one supporting portion is configured as one or more supporting portions.

4. The microphone chip of claim 1, wherein the microphone chip further comprises an electrode sheet and an electrode guiding member; wherein the electrode sheet is disposed on a side of the back plate close to the diaphragm, and the electrode sheet is divided into at least two pieces of electrode sheets by the supporting member; and the electrode guiding member is configured to simultaneously lead out the at least two pieces of electrode sheets.

5. The microphone chip of claim 4, wherein the back plate defines at least two lead-out holes; wherein the electrode guiding member is connected to a side of the back plate away from the diaphragm, and part of the electrode guiding member is connected to the at least two pieces of electrode sheets respectively through the at least two lead-out holes.

6. The microphone chip of claim 4, wherein the electrode guiding member is made from a metal material or another conductive material.

7. A microphone, comprising:

a microphone body; and a microphone chip mounted on the microphone body, wherein the microphone chip comprises:

a substrate having a front cavity; and a capacitance system disposed on the substrate, wherein the capacitance system comprises a diaphragm disposed on an upper surface of the substrate and a back plate spaced from the diaphragm, and there is an air spacing defined between the diaphragm and the back plate, wherein the microphone chip further comprises a fixing portion, and the diaphragm and the back plate are respectively connected with the substrate through the fixing portion;

the diaphragm comprises an inner membrane portion, at least one outer membrane portion, and at least one supporting portion, wherein the inner membrane portion and each outer membrane portion define a corresponding gap therebetween, and each of the at least one supporting portion is connected with the fixing portion and the inner membrane portion or is connected with the fixing portion and a corresponding one of the at least one outer membrane portion; and the microphone chip further comprises a supporting member, and the supporting member is connected with the back plate and is disposed between the back plate and the inner membrane portion; and in response to the microphone chip being in an operating state, the inner membrane portion is adsorbed on the supporting member, and the supporting member is configured to divide the inner membrane portion into at least two regions;

the supporting member comprises a closing portion and a partition portion; in a thickness direction of the microphone chip, the closing portion is disposed above the inner membrane portion and near an outer periphery of the inner membrane portion; and the partition portion is connected to an inner circumference of the closing portion.

8. The microphone of claim 7, wherein each of the at least one supporting portion extends outward along a corresponding edge of the inner membrane portion and is connected to the fixing portion; and the at least one outer membrane portion is fixedly connected to the fixing portion.

9. The microphone of claim 8, wherein the at least one supporting portion is configured as one or more supporting portions.

10. The microphone claim 7, wherein the microphone chip further comprises an electrode sheet and an electrode guiding member; wherein the electrode sheet is disposed on a side of the back plate close to the diaphragm, and the electrode sheet is divided into at least two pieces of electrode sheets by the supporting member; and the electrode guiding member is configured to simultaneously lead out the at least two pieces of electrode sheets.

11. The microphone of claim 10, wherein the back plate defines at least two lead-out holes; wherein the electrode guiding member is connected to a side of the back plate away from the diaphragm, and part of the electrode guiding member is connected to the at least two pieces of electrode sheets respectively through the at least two lead-out holes.

12. The microphone of claim 10, wherein the electrode guiding member is made from a metal material or another conductive material.

* * * * *